(12) United States Patent
Becken

(10) Patent No.: US 6,867,696 B2
(45) Date of Patent: Mar. 15, 2005

(54) WIRELESS TRANSMISSION OF SIGNALS AND STATUSES FROM MOBILE DEVICES TO STATIONARY OR MOBILE DEVICES

(75) Inventor: Martin Becken, Viersen (DE)

(73) Assignee: FRABA Sicherheitssysteme GmbH, Köln (DE)

( * ) Notice: Subject to any disclaimer, the term of this patent is extended or adjusted under 35 U.S.C. 154(b) by 457 days.

(21) Appl. No.: 09/897,799

(22) Filed: Jul. 2, 2001

(65) Prior Publication Data
US 2003/0003903 A1 Jan. 2, 2003

(51) Int. Cl.[7] ............................................. G08B 13/14
(52) U.S. Cl. ............................ 340/572.4; 340/572.7; 340/572.8
(58) Field of Search .......................... 340/572.1, 572.2, 340/572.4, 572.5, 572.6, 572.7, 448, 539.23, 573.1, 10.1; 342/44, 50, 51; 235/380, 382

(56) References Cited

U.S. PATENT DOCUMENTS

| | | | | |
|---|---|---|---|---|
| 3,689,885 A | * | 9/1972 | Kaplan et al. ............. 340/10.1 |
| 4,793,185 A | * | 12/1988 | Boettger et al. ............. 73/643 |
| 5,376,778 A | * | 12/1994 | Kreft ........................... 235/382 |
| 5,485,154 A | * | 1/1996 | Brooks et al. ................ 342/44 |
| 6,249,121 B1 | * | 6/2001 | Boskamp et al. ........... 324/318 |
| 6,529,127 B2 | * | 3/2003 | Townsend et al. ....... 340/572.4 |
| 6,615,074 B2 | * | 9/2003 | Mickle et al. ........... 340/573.1 |

* cited by examiner

Primary Examiner—Van T. Trieu
(74) Attorney, Agent, or Firm—Howson and Howson

(57) ABSTRACT

A device is provided for wireless transmission and evaluation of signals and switching statuses from at least one mobile device (10) to a second device (11), where at least one of the devices is capable of moving over a predefined travel path. A transmission link (12) is provided between devices (10) and (11). A transmission feeds the energy supply for the mobile device (10). At least one sensor device (9), connected to mobile device (10), brings about modulation on transmission link (12) between the two devices in accordance with a random signal string of the sensor. A receiving device is provided for modulation in device (11). A transmission device for transmission across transmission line (12) comprises at least two coupled coil devices (13, 14), which are mechanically and topologically independent of each other. The path of movement is not subject to those restrictions to which conventional devices are subject.

21 Claims, 5 Drawing Sheets

WIRELESS TRANSMISSION OF SIGNALS AND STATUSES FROM MOBILE DEVICES TO STATIONARY OR MOBILE DEVICES

CROSS REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION (1) Field of the Invention

The invention relates to a device for wireless transmission of switching statuses, signals and protocols from sensors that are capable of moving along a defined path and are connected to a mobile device.

(2) Description of Related Art Including Information Disclosed Under 37 C.F.R. 1.987 and 1.98

A device for monitoring a device capable of moving along a defined path is already known from EP 0 927 918 A2 and EP 0 092 773. In these devices, transmission from the mobile device to the stationary device is achieved via 2 toroidal-core coupling elements and a conductor loop passing through these circular toroidal cores. Accordingly, the two toroidal cores are topologically coupled by the conductor loop.

The disadvantage of these known devices is that there is only one degree of freedom in relation to the movement along the conductor loop, this being defined by the diameter of the toroidal cores. A further disadvantage is the fact that travel along the conductor loop is limited by the conductor loop being fastened to the mobile device. Another disadvantage of the known device is that no circular paths >360° can be used, as the conductor loop needs to be fastened to the mobile rotary body at least one point. This makes it impossible, for example, to transmit signals from devices that rotate as they move.

The object of the invention is thus to create a device of simple design for the wireless transmission of signals and statuses from mobile devices to stationary or mobile devices, where the path of movement is not subject to such restrictions as with conventional devices.

BRIEF SUMMARY OF THE INVENTION

The solution of this object is based on the concept of realizing mechanical independence of the stationary and mobile devices by means of coil systems capable of free motion relative to each other.

To this end, the device according to the invention comprises a transmission device with at least two coupled coil devices, which are mechanically and topologically independent of each other. This means, in particular, that the two coil devices are not topologically wrapped around each other.

In this context, the signals are transmitted via the loose coupling of the two coil devices, which form part of resonant circuits, where one coil device is mounted along the envisaged travel path. Coupling, and thus data transmission, is accomplished via a small coil device. In this context, it is irrelevant which coil device is used as a stationary device and which coil device is mobile. Coupling can also be accomplished between two elongated coil devices moving relative to each other.

The possible travel path of the devices can be of any shape, extend in all three spatial directions and is not restricted, as long as the electromagnetic fields of the two coil devices are coupled. This coupling occurs within a volume that can be defined by a section plane enclosing this coupling volume. The transmission link for passing the signals, statuses or protocols between the devices is created there. Generally speaking, the term "travel path" describes the set of positions assumed by the two coil devices relative to each other during motion. For instance, if one of the devices remains stationary, while the second device moves, a random point on the moving device, particularly a point on the moving coil device, is guided on the travel path. These points on the moving device are generally rigid in relation to each other, meaning that each of these points displays a congruent, but offset travel path. However, the invention is not restricted to this. Generally speaking, the travel path can lie in a two-dimensional plane in three-dimensional space, or also within a volume. The mobile unit and the stationary unit can be mounted completely independently on each other and are, in principle, not restricted to a particular shape by the transmission device. This shape can advantageously be adapted to suit the respective application.

In this context, the coil devices are part of two coupled resonant circuits, these being used to transmit the energy from the stationary device to the mobile device, as well as to transmit signals or statuses from the mobile unit to the stationary unit.

One of the coil devices is mounted along the entire travel path, it being irrelevant whether this is the stationary system or the mobile one.

Both resonant circuits possess devices for automatic or manual adjustment, thus ensuring optimum adaptation of the electromagnetic characteristics of the coils to the mechanical environment.

The stationary device has an evaluating device which, among other things, generates a carrier signal for the one resonant circuit (sending resonant circuit) which transmits electromagnetic energy to the coil of the mobile device (receiving coil) in this way.

The mobile device, to which the sensors are connected, has a damping device which generates the required operating voltage and can also dampen the resonant circuit of the receiving coil. This damping can be detected in the sending coil by the evaluating device on the basis of the non-vanishing coupling between the two coil systems.

The sensors whose status is of interest are connected to the mobile device. This status is analysed by one or more sensor evaluators and forwarded to the damping device via a random signal string.

This signal string dampens the receiving coil, so that the evaluating device of the stationary device can detect the status of the sensors.

The status is made available to external devices via at least one signaling device for further processing. This signal can, for example, be used to stop the motion.

In an advantageous configuration, the coils are constructed from individual, plug-in coil elements that can be joined with little assembly effort and thus permit the realization of transmission devices of virtually any desired length.

In one configuration, both devices are mobile. They possess a section plane that jointly overlaps at all times, meaning that transmission is always possible.

In another configuration, a microcontroller is responsible for the task of signal generation in the mobile device, meaning that even complex sensors with analogue output signals or fixed protocols can be evaluated advantageously. In contrast to transmission by modulation using a simple pulse string, the use of complex transmission protocols also permits error-detecting and/or error-correcting transmission, for example.

BRIEF DESCRIPTION OF THE SEVERAL VIEWS OF THE DRAWINGS

The invention is described in more detail below on the basis of drawings. The drawings show the following.

DETAILED DESCRIPTION OF THE INVENTION

Figure 1:
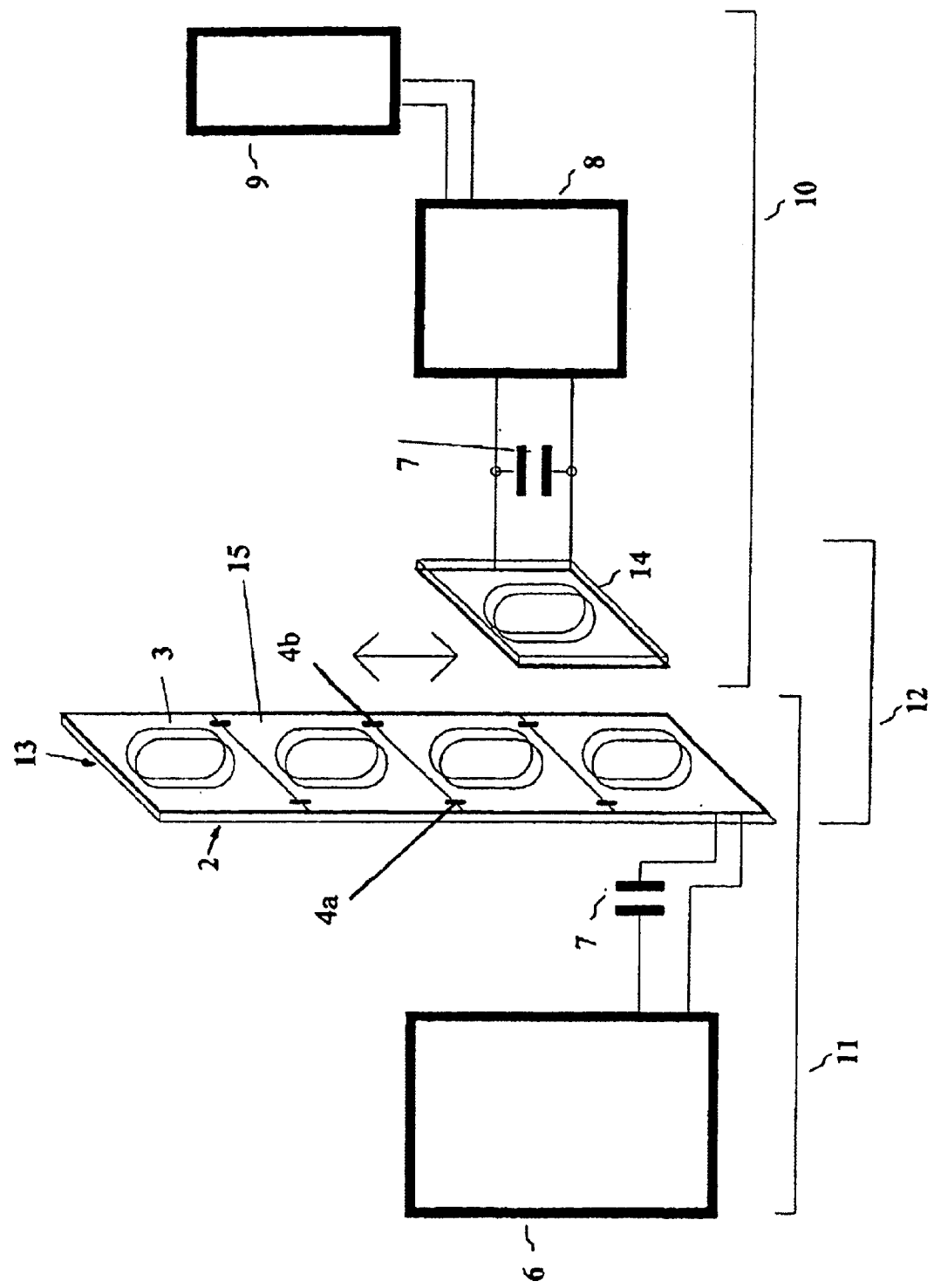
FIG. 1: A block circuit diagram of the arrangement according to the invention, with a long coil device on the stationary device and a short coil device on the mobile device.

The device is based on the transmission of energy from the stationary device (11) to the mobile device (10) and of data from the mobile device (10) to the stationary device (11). Two coupled resonant circuits are formed to this end, consisting of capacitor (5) and transmitter coil (13), on the one hand, and capacitor (7) and receiver coil (14), on the other (see FIGS. 1 and 2).

Figure 3:
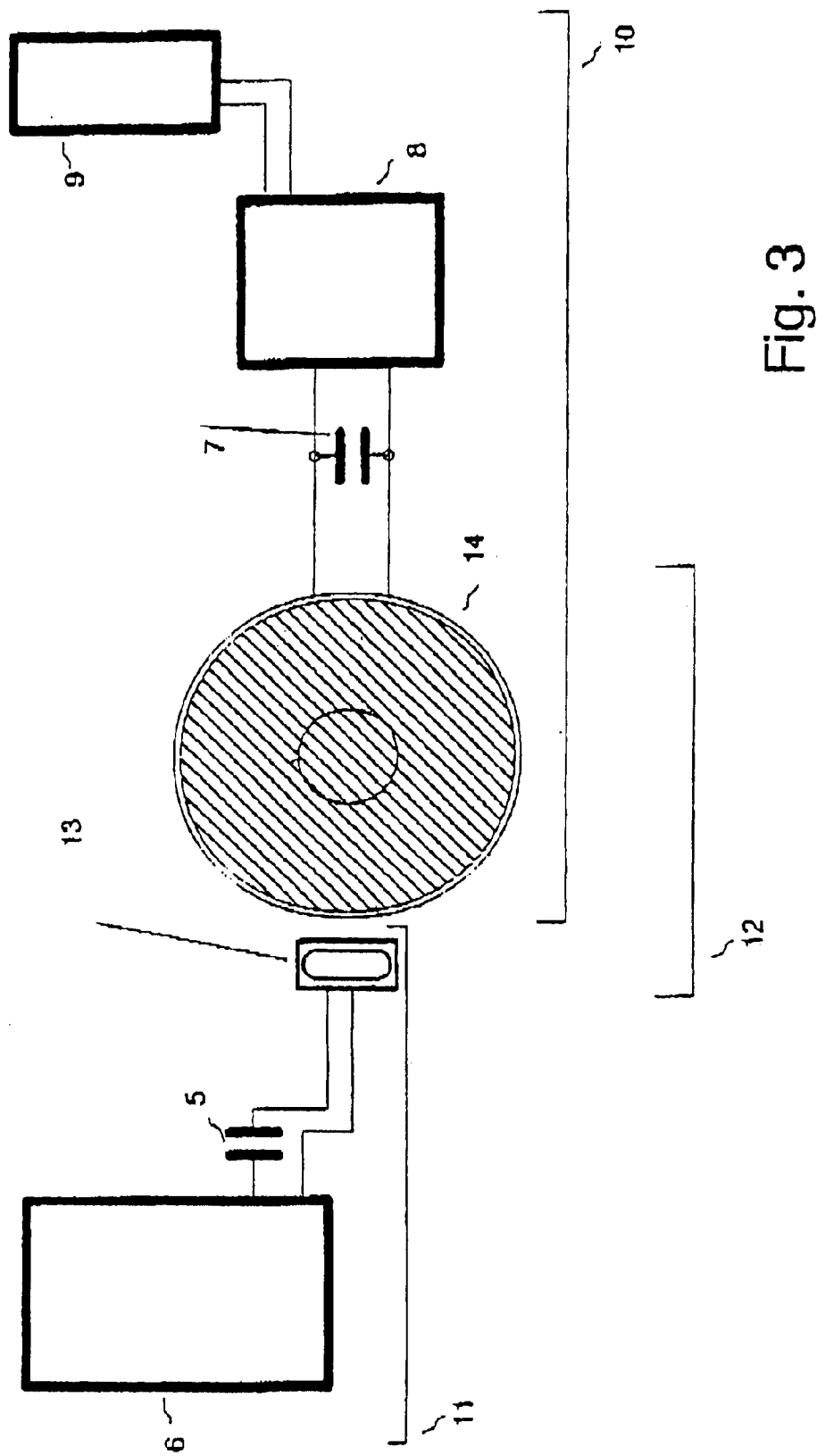
FIG. 3: A block circuit diagram of the arrangement according to the invention, with a short coil device on the stationary device and a circular coil device on the mobile (rotating) device.
Figure 4:
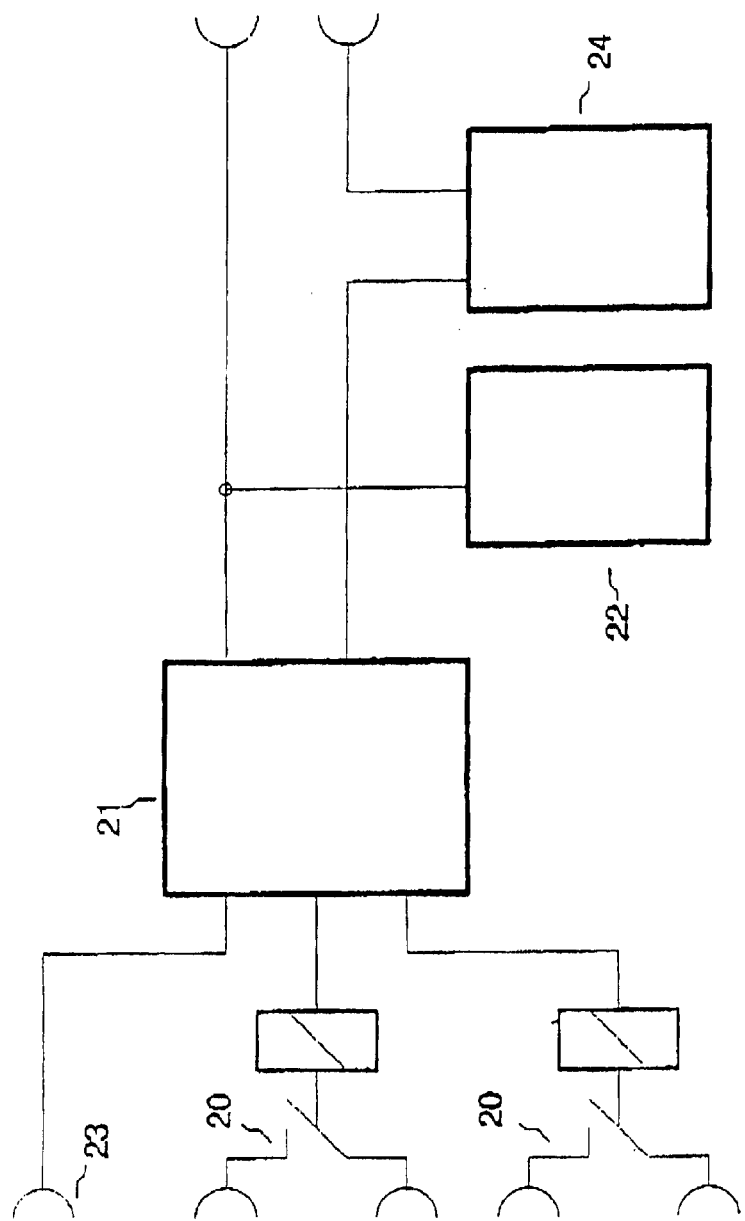
FIG. 4: A block circuit diagram of the evaluating device of the stationary device.

An evaluating device (6) (shown in FIGS. 1–3, and in more detail in FIG. 4) consists of a carrier generating and output stage device (22), a signal decoding device (22), at least one device (20) for signaling different statuses, a data interface (23) and a device (24) for adjusting the series-resonant circuit comprising capacitor (5) and transmitter coil (13). This device permits manual or automatic adjustment, The functions of the signal decoding device (21), the data interface (23), the carrier generator (22) and the device for automatic adjustment (24) are realized by a microcontroller and its peripheral modules. The evaluation device may comprise a transponder in the form of an application specific integrated circuit (ASIC).

Figure 5:
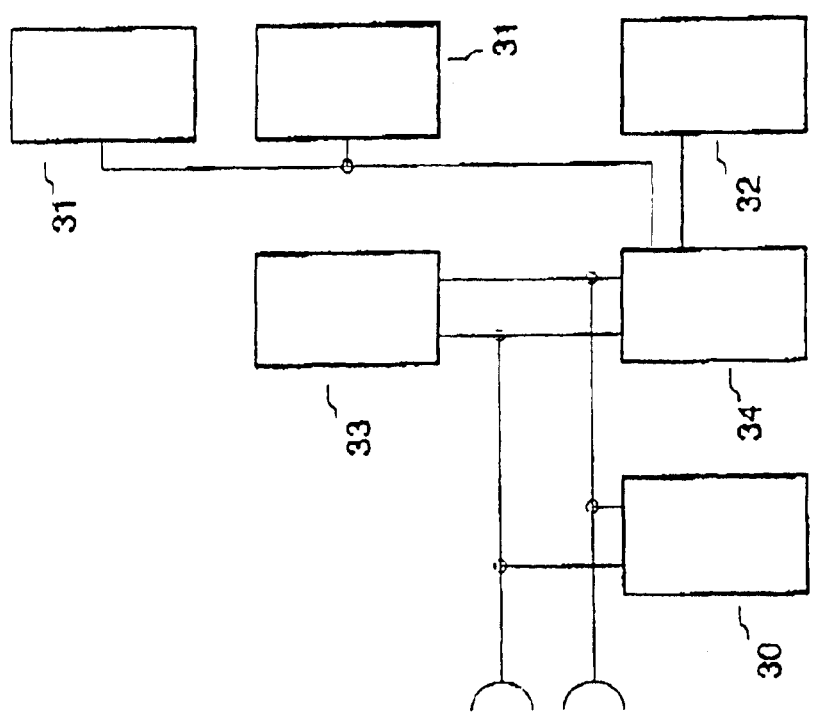
FIG. 5: A block circuit diagram of the damping device of the mobile device.

The damper (8) (see FIG. 5) comprises the operating voltage generating device (33), a switchable attenuator (34), a signal generator (32), a device (30) for adjusting the parallel-resonant circuit comprising capacitor (7) and receiving coil (14), and at least one sensor evaluator (31). The functions of signal generator (32), sensor evaluator (31) and adjusting device (30) are provided by a low-current microcontroller and its peripheral modules. The device (30) for adjusting the resonant circuit permits manual or automatic adjustment. Evaluating device (6) contains a carrier generator with output stage (22) which, for example, generates a square-wave carrier voltage of 125 kHz, for instance. This carrier voltage is used to supply the series-resonant circuit comprising capacitor (5) and transmitter coil (13). In this way, transmitter coil (13) passes electromagnetic energy to receiver coil (14). A device (24) for automatic adjustment of the resonant circuit comprising capacitor (5) and transmitter coil (13) within evaluating device (6) provides optimum adjustment of the electromagnetic characteristics of the transmitter coil (13) to the mechanical ambient conditions. Transmitter coil (13) and receiver coil (14) form a loosely coupled transformer with non-vanishing coupling. As a result of the coupling of the coils, part of the electrical energy fed into transmitter coil (13) is collected in receiver coil (14) and supplies the parallel-resonant circuit comprising capacitor (7) and receiver coil (14). Within mobile device (10), this energy is fed to damper (8), serving operating voltage generating device (33) as a source of energy for supplying the components in mobile device (10).

Damper (8) contains a switchable attenuator (34), with the help of which the resonant circuit comprising capacitor (7) and receiver coil (14) can be damped. This damping results in a voltage fluctuation on receiver coil (14) and, owing to the non-vanishing coupling, also to a voltage fluctuation on transmitter coil (13). This voltage fluctuation can be analysed by signal decoder (21). If switchable attenuator (34) is driven by a random signal string, this signal string becomes detectable in signal decoder (21) by the transmission mechanism described.

In device (1), a signal generator (32) is used to generate at least one signal frequency which is detected and evaluated in signal decoder (21) by the above-mentioned transmission mechanism. If the function of switchable attenuator (34) is controlled by the status of one or more sensor evaluators (31), a conclusion as to the status of sensors (9) is drawn in signal decoder (21) based on the status of the transmitted signal. The signal decoder sets the output statuses, for instance by means of a connected relay (20) reflecting the status of sensors (9).

In one configuration, a microcontroller in damper (8) assumes the tasks of the signal generator (32) and signal evaluator (31) devices. This microcontroller can evaluate the sensors. In this context, the device is no longer dependent on the digital nature of sensors (9). The device can advantageously detect sensors with analogue and digital output voltages, and can also transmit defined protocols of external equipment connected to mobile device (10). In addition to simple signal strings, the microcontroller can also apply complex protocols to switchable attenuator (34). Signal decoder (21) detects the statuses of sensors (9) from these signals and protocols, itself setting statuses on relays (20) and data interface (21) that correspond to those on sensors (9).

Transmission link (12) is provided by transmitter coil (13) and receiver coil (14). These two coils are neither mechanically connected, nor wrapped around each other. Mobile device (10) can be removed from stationary device (11) at any time, without any assembly work necessitated by the transmission device. The advantageous result of this is that the shape of transmitter coil (13) and receiver coil (14) can be adapted at will to suit the requirements of the installation site. The great distance possible between transmitter coil (13) and receiver coil (14) advantageously permits mechanical designs with large tolerances, which can be realized at low cost.

Transmitter coil (13) and receiver coil (14) consist of at least one coil element (2). This coil element (2) consists of coil housing (15), individual coil (3) and pairs of plug-in connectors 4a and 4b, as shown in FIG. 1. Individual core (3) can have one or more windings in this context. As a result of this arrangement, individual coil elements (2) can be joined with a minimum of assembly effort to produce transmitter coils (13) and receiver coils (14). In this context, the cross-sections of several individual coils form the cross-section of the transmitter or receiver coil, where the overall coil is formed by an electrical series connection of individual coils (3). In another configuration of the invention, it is also possible for several coils to be connected in parallel within the overall coil, in order to set the capacitive or inductive characteristics of the assembled coil, for example. As the fields of adjacent coil elements overlap the cross-sectional plane, coupling of the receiver and transmitter coil can be obtained over the entire cross-section of the assembled coil (13, 14). The modular design described means that virtually any length of the transmission device can be realized.

Figure 2:
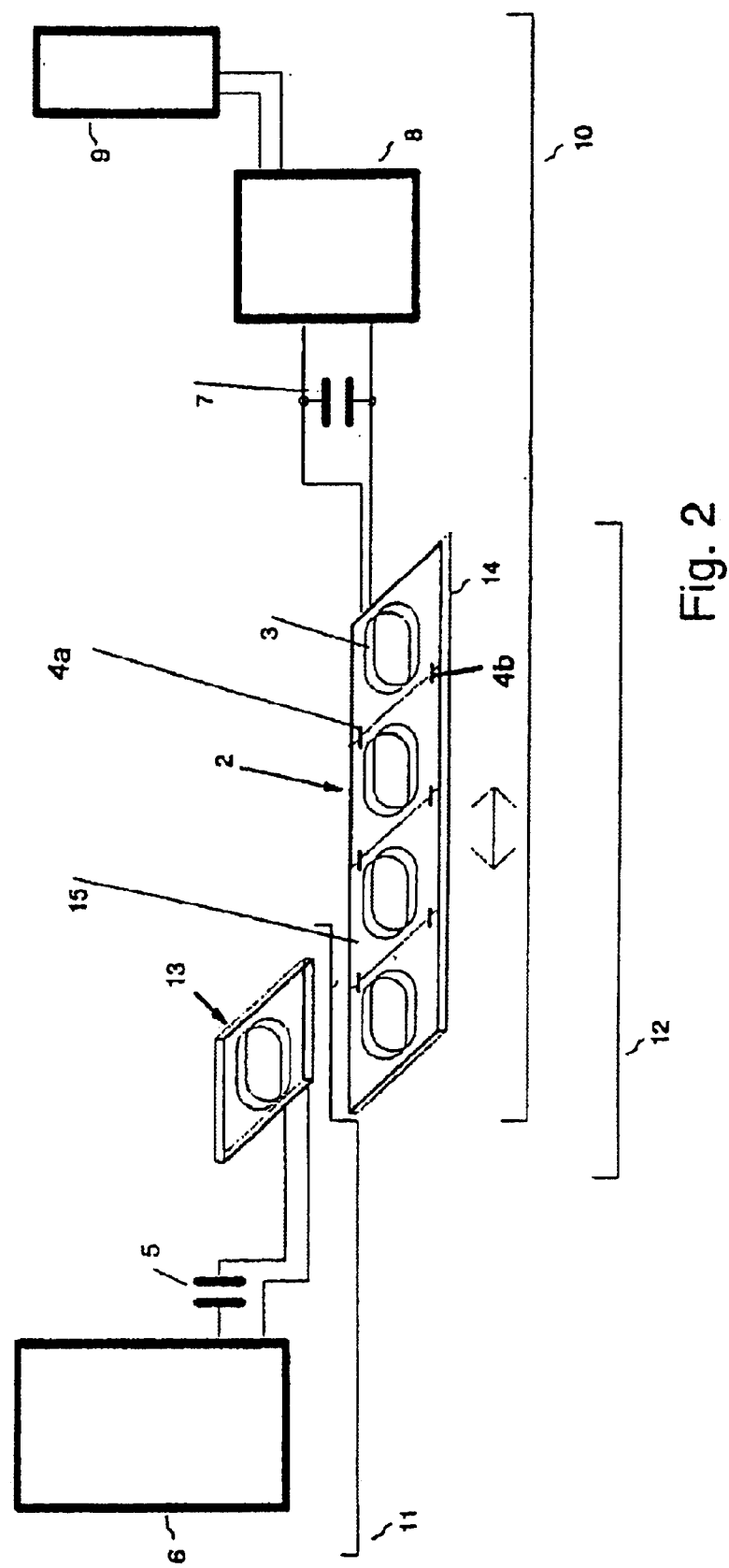
FIG. 2: A block circuit diagram of the arrangement according to the invention, with a short coil device on the stationary device and a long coil device on the mobile device.

In another configuration, the long coil device (for example, the transmitter coil in FIG. 1 or the receiver coil in FIG. 2) is realized in the form of a multi-core line, the individual cores of which constitute the windings of the coil. In FIG. 2, the coil elements are connected by pairs of plug-in connectors 4c and 4d. In this context, the line is arranged in such a way that it encloses an area defining the coil cross-section. Individual cores are connected at their ends in order to form the coil. The line is accommodated in a cable duct, for example. The number of cores thus defines the number of coil windings. Any desired coil length can be achieved in this way, the term "coil length" referring to the coil dimension in the direction of the maximum extension of the coil cross-section.

The device can be used, for example, to monitor the closing edges of horizontally moving sliding gates, in which case a mobile coil device (14), adapted to the gate length and mounted on the gate, moves past a small coil device (13) of the stationary device (see FIG. 2), or on vertically moving roller gates, in which case a stationary coil device (13), adapted to the gate length, is mounted on the gate guide and a small coil device (14) is moved past with the mobile device (see FIG. 1).

Another application relates to the monitoring of the filling level and tearing of goods to be wound on rotating machines. This makes advantageous use of the characteristic of the invention of having no mechanical tie between transmitter coil (13) and receiver coil (14) (see FIG. 3). In this case, receiver coil (14) is mounted on the rotating part of the machine, while transmitter coil (13) is stationary.

Another application concerns the transmission of signals between two mobile devices (X-Y tables) that move relative to each other in one plane. In this case, the extension of the coil devices for the X and Y direction is adapted to the length of the X and Y travel path. Signal transmission can take place as long as it is ensured that the X and Y coil devices have a common section plane.

SEQUENCE LISTING

Not applicable

I claim:

1. A device for wireless transmission and evaluation of signals and switching statuses from at least one mobile device (10) to a second device (11), where at least one of the devices is capable of moving over a predefined travel path, with a transmission link (12) between devices (10) and (11), with a transmission for feeding the energy supply for mobile device (10), with at least one sensor device (9), connected to mobile device (10), which brings about modulation on transmission link (12) between the two devices in accordance with a random signal string of the sensor, with a receiving device for modulation in device (11), wherein a transmission device for transmission across transmission line (12) comprises at least two coupled coil devices (13, 14), which are mechanically and topologically independent of each other, and wherein at least one coil device (13, 14) is constructed by plugging together individual, modular coil elements (2), in order to realize links of any length.

2. A device in accordance with claim 1, in which the travel path of the mobile devices is of two or three-dimensional form.

3. A device in accordance with claim 1, in which the transmission link (12) is realized by means of a short-range transmission link formed by two coupled, mutually tuned resonant circuits.

4. A device in accordance with claim 1, in which, based on the mechanical independence of the coil devices (13, 14), the transmission device is designed for transmission on a closed, particularly circular, travel path.

5. A device in accordance with claim 1, in which each modular coil element (2) is provided with a contacting device (4) and that coil elements (2) and the contacting device (4) are integrated in a mechanically fixable coil housing.

6. A device in accordance with claim 1, in which, in order to guarantee coupling between the at least two coil devices (13, 14) over the entire travel path, the extension of the coil device of the stationary device (13) is greater than the extension of the coil device of the mobile device (14).

7. A device in accordance with claim 1, in which, in order to guarantee coupling between the at least two coil devices (13, 14) over the entire travel path, the extension of the mobile coil device of the device is greater than the extension of the coil device of the stationary device.

8. A device in accordance with claim 1, in which at least one coil device (13, 14) can be constructed for any length of link by using at least one multi-core line whose cores (number n) are connected to form a coil with n windings.

9. A device in accordance with claim 1, in which the distance between the two coil devices (13, 14) increases with the magnitude of the extension of the coil devices, particularly with the distance between the wires transverse to the direction of the longest extension of the coil.

10. A device in accordance with claim 1, in which the distance between the two coil devices (13, 14) varies within a given range along the travel path.

11. A device in accordance with claim 1, in which the coil device (14) of the mobile device (10) can be guided on a straight line along the coil device (13) of the stationary device (11), where significant deviations occur in parallel guidance in relation to the other two spatial directions.

12. A device in accordance with claim 1, in which the stationary device (11) displays a transmitter coil device (13) with at least one coil element (2) having a coil (3) and a 2-pole plug-in connector system, as well as an evaluating unit (6), which assumes different output statuses in accordance with the modulation of the transmission link (12), and a tunable series-resonant circuit, comprising capacitor (5) and transmitter coil (13) where the evaluating device (6) comprises a transponder application specific integrated circuit.

13. A device in accordance with claim 1, in which the mobile device (10) displays a parallel-resonant circuit, comprising a capacitor (7), and a receiver coil device (14), as well as a damper (8), which contains a device (30) for automatic adjustment of the resonant circuit, at least one sensor evaluator (31), at least one signal generator for generating a dynamic modulation signal (32), an attenuator (34) for generating the modulation signal on the transmission link (12), an operating voltage generating device (33) and a fastening device for mounting on a moving part.

14. A device in accordance with claim 1, in which the damper (8) in the mobile device (10) displays electronic equipment consisting exclusively of low-power components, the power requirement of which is extremely low in order to increase system reliability.

15. A device in accordance with claim 1, in which, due to a controller of damper (8) in mobile device (10), not only simple pulse strings can be transmitted to stationary device (11), but also protocols of any degree of complexity.

16. A device in accordance with claim 1, in which the sensors (9) that can be connected to mobile device (10) are designed as digital sensors like switches and/or are sensors which communicate with damper (8) via a complex protocol.

17. A device in accordance with claim 1, in which a predefined type of modulation can be used to distinguish any statuses of the sensors (9) on the mobile device (10) from malfunctions of the device (1).

18. A device in accordance with claim 1, in which a signal decoding device (21) in the evaluating device (6) of the stationary device (11) decodes a complex protocol and encompasses a data interface (23) for downstream computer systems.

19. A device in accordance with claim 1, in which a signal decoding device (21) in the evaluating device (6) of the stationary device (11) encompasses digital outputs (20) in the event of digital sensors (9) being connected in mobile device (10).

20. A device for wireless transmission and evaluation of signals and switching statuses from at least one mobile device (10) to a second device (11), where at least one of the devices is capable of moving over a predefined travel path, with a transmission link (12) between devices (10) and (11), with a transmission for feeding the energy supply for mobile device (10), with at least one sensor device (9), connected to mobile device (10), which brings about modulation on transmission link (12) between the two devices in accordance with a random signal string of the sensor, with a receiving device for modulation in device (11), wherein a transmission device for transmission across transmission line (12) comprises at least two coupled coil devices (13, 14), which are mechanically and topologically independent of each other, in which each modular coil element (2) is provided with a contacting device (4) and that coil elements (2) and the contacting device (4) are integrated in a mechanically fixable coil housing.

21. A device for wireless transmission and evaluation of signals and switching statuses from at least one mobile device (10) to a second device (11), where at least one of the devices is capable of moving over a predefined travel path, with a transmission link (12) between devices (10) and (11), with a transmission for feeding the energy supply for mobile device (10), with at least one sensor device (9), connected to mobile device (10), which brings about modulation transmission link (12) between the two devices in accordance with a random signal string of the sensor, with a receiving device for modulation in device (11), wherein a transmission device for transmission across transmission line (12) comprises at least two coupled coil devices (13, 14), which are mechanically and topologically independent of each other, in which the stationary device (11) displays a transmitter coil device (13) with at least one coil element (2) having a coil (3) and a 2-pole plug-in connector system, as well as an evaluating unit (6), which assumes different output statuses in accordance with the modulation of the transmission link (12), and a tunable series-resonant circuit, comprising capacitor (5) and transmitter coil (13) where the evaluating device (6) comprises a transponder application specific integrated circuit.

* * * * *